(12) United States Patent
Colacecchi

(10) Patent No.: US 7,253,744 B2
(45) Date of Patent: Aug. 7, 2007

(54) AUTOMATICALLY ADJUSTING PASSENGER READING LIGHT SYSTEM AND METHOD

(75) Inventor: Jay W Colacecchi, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 193 days.

(21) Appl. No.: 11/134,877

(22) Filed: May 23, 2005

(65) Prior Publication Data

US 2006/0261970 A1 Nov. 23, 2006

(51) Int. Cl.
G08B 21/00 (2006.01)
(52) U.S. Cl. .................. 340/686.1; 340/945; 362/471; 362/802
(58) Field of Classification Search ............. 340/686.1, 340/687, 691.1, 945; 362/470, 471, 802; 307/9.1, 10.8
See application file for complete search history.

(56) References Cited

U.S. PATENT DOCUMENTS 5,873,644 A * 2/1999 Roessner et al. ........... 362/551
6,614,126 B1 * 9/2003 Mitchell ..................... 307/9.1
6,796,690 B2   9/2004 Bohlander .................. 362/471
6,997,583 B2 * 2/2006 Broelemann ................ 362/471

* cited by examiner

Primary Examiner—Toan N. Pham
(74) Attorney, Agent, or Firm—Harness, Dickey & Pierce, P.L.C.

(57) ABSTRACT

A lighting system and method for producing an automatically positionable light beam that is aimed in accordance with the position of a seatback portion of a seat on a mobile platform. The system includes a light assembly having independent first and second light subsystems, with each light subsystem having a plurality of LEDs or incandescent bulbs. A switch mounted on the seat detects when the seatback portion of the seat is in an upright or a reclined position, and provides a signal to the light assembly in accordance with the position of the seatback. The signal is used to turn on either the first light subsystem to illuminate a lap area of the occupant when the seat is in its upright position, or the second light subsystem to illuminate an area slightly rearwardly of the occupant's lap when the seat is in the reclined position. Thus, optimum positioning of the light beam produced by the light assembly is achieved automatically, without requiring any manual adjustment by the seat occupant.

20 Claims, 4 Drawing Sheets

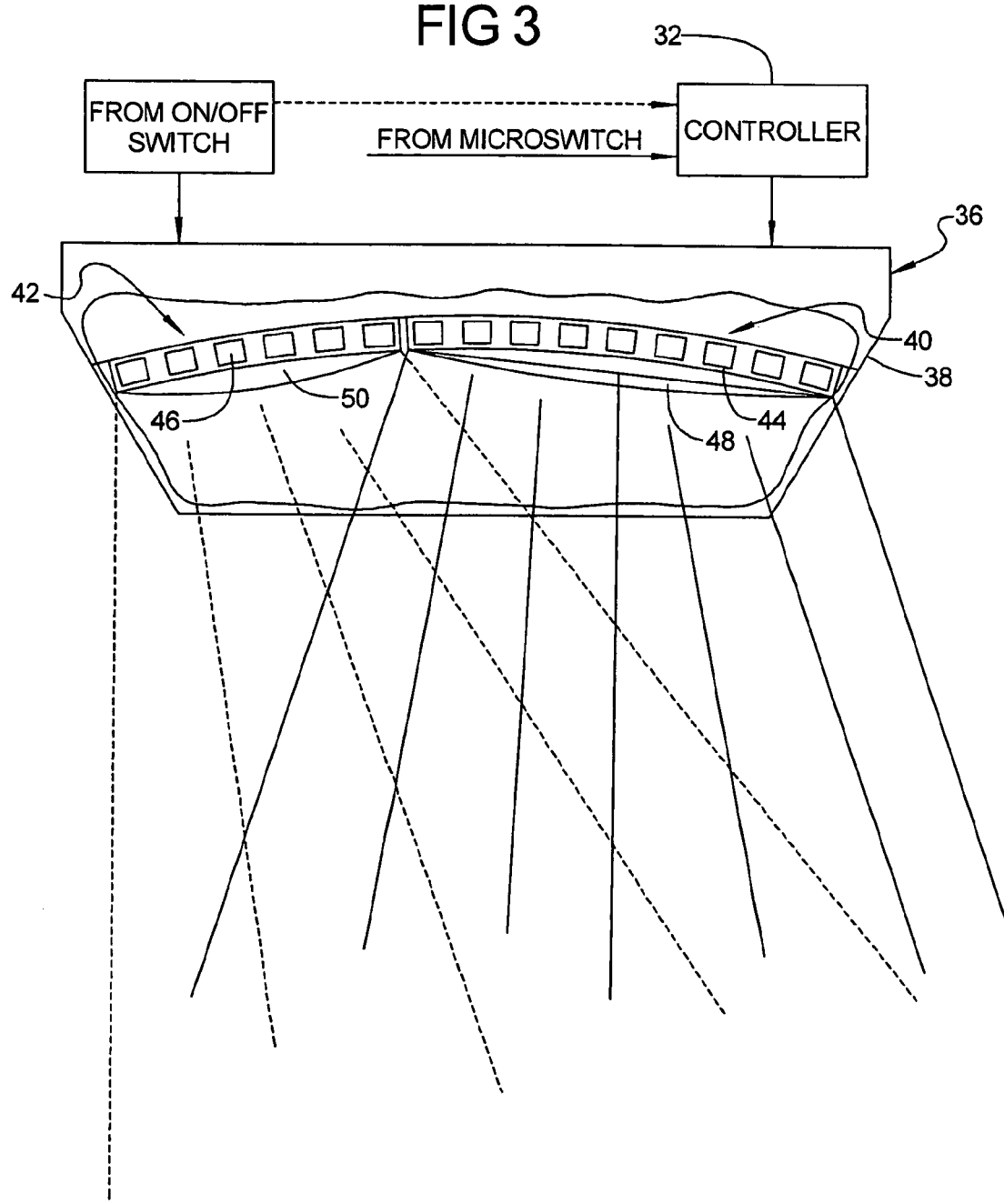

AUTOMATICALLY ADJUSTING PASSENGER READING LIGHT SYSTEM AND METHOD

FIELD

The present disclosure relates to lighting systems, and more particularly to a lighting system adapted for use on a mobile platform in which the light beam projected by the light system is automatically aimed at different areas of the seat in response to the position of a seatback portion of the seat.

BACKGROUND

Various forms of mobile platforms, and particularly commercial aircraft, typically employ a reading light positioned in an overhead area over each seat on the mobile platform. Typically, these lights have been manually adjustable by the seat occupant. Such lights are typically of a relatively complex construction that employs an orbitally supported light element. The housing of the light element may be grasped and manually positioned by the seat occupant so that it illuminates a first area over the seat when the occupant is seated in an upright position in the seat, and a second area that is slightly rearward of the first area, when the occupant reclines the seat into a reclined position. In this manner, the aiming of the light beam is optimized for the occupant's use, regardless if the occupant is seated in an upright position or a reclined position.

While such light assemblies have served their intended purpose, it would be highly desirable to provide a light system that aims the light beam in different directions, depending on the position of the seat, automatically without any intervention or manual control by the seat occupant. This would enable optimum use of the light when the occupant is reading or working, without the inconvenience of the user having to manually position the light when he/she changes his/her seating position.

SUMMARY

The present disclosure is directed to a reading light system and method that automatically re-aims a light beam directed at a seat in accordance with a sensed position of the seatback portion of the seat. In one implementation, the light system includes a light assembly having a first light subsystem and a second light subsystem. The light system is secured to a suitable area over or adjacent the seat so as to be able to illuminate specific areas of the seat. The first light subsystem is aimed so as to illuminate the lap area of the seat occupant when the occupant is seated in an upright position in the seat. The second light subsystem is aimed so as to illuminate an area slightly rearwardly of the area illuminated by the first light subsystem to enable the seat occupant to read, write or perform other tasks where light is needed while occupying the seat in a reclined position.

A sensor is employed to detect when the seatback is in an upright position and also in a reclined position. The sensor is interfaced to the light system and controlled in response to the position of the seatback portion of the seat. When the sensor detects that the seatback portion is in the upright position, then the first light subsystem is enabled for use. When the seatback portion is reclined by the user, this condition is sensed by the sensor and the second light subsystem is automatically turned on. Optionally, the first light subsystem can be turned off when the sensor detects that the seatback portion has been urged into a reclined position.

In one implementation a controller is used to receive signals from the sensor. The controller generates output signals to the light assembly that controls the first and second light subsystems in accordance with the sensed position of the seatback portion of the seat.

In one implementation each of the light subsystems is formed by a plurality of light-emitting diodes (LEDs). The first light subsystem may also include a reflector for forming a desired beam pattern over the lap area of the occupant seated in the seat. Similarly, the second light subsystem may include a reflector for generating a desired light beam pattern over the portion of the seat that would enable optimum use of the light while the occupant is in the reclined position.

In one implementation the sensor comprises a microswitch supported adjacent the seatback of the seat. In another implementation a conventional open/closed switch is used, which is wired in series with the light system, and which senses the position of the seatback of the seat.

The various embodiments enable automatic re-aiming of the light beam from the light assembly without any manual adjustment or intervention by the occupant seated in the seat. This system and method of the present disclosure further provides for a light assembly that is of less complex construction, lighter in weight and potentially less costly to construct.

Further areas of applicability of the present disclosure will become apparent from the detailed description provided hereinafter. It should be understood that the detailed description and specific examples, while indicating the preferred embodiment of the present disclosure, are intended for purposes of illustration only and are not intended to limit the scope of the present disclosure.

BRIEF DESCRIPTION OF THE DRAWINGS

The present disclosure will become more fully understood from the detailed description and the accompanying drawings, wherein:

FIG. 3 is a simplified view of the light assembly illustrating the two light subsystems;

DETAILED DESCRIPTION

The following description of various embodiment(s) is merely exemplary in nature and is in no way intended to limit the present disclosure, its application, or uses.

Figure 1:
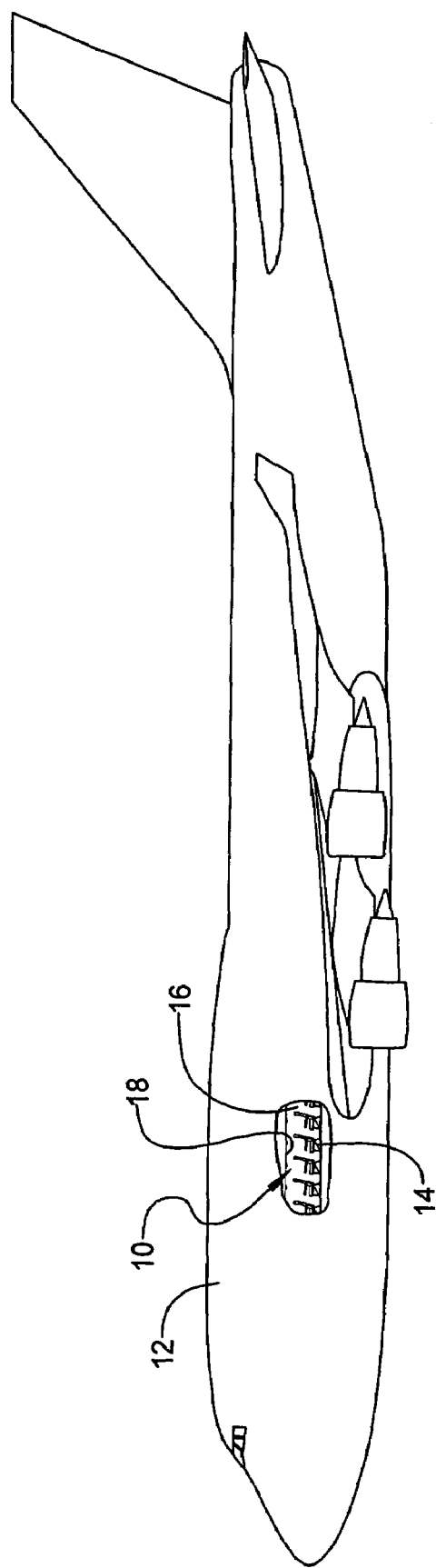
FIG. 1 is a perspective view of a mobile platform, in this example a commercial aircraft, employing an embodiment of the present disclosure.

Referring to FIG. 1, there is shown a light system 10 in accordance with one embodiment of the present disclosure implemented on a mobile platform. In this example, the mobile platform is a commercial aircraft 12. The light system 10 is used in connection with a given seat 14 in a cabin area 16 of the mobile platform 12. A separate light system 10 is used in connection with each seat 14. The light system 10 includes a light assembly that will be described and shown in greater detail in FIGS. 2 and 3, which is supported from an overhead wall portion 18 in the cabin area 16. Thus, each seat 14 has an independent one of the systems 10 associated with it. While a commercial aircraft 12 has been shown in FIG. 1, it will be appreciated that the light system 10 can be implemented in virtually any form of mobile platform, such as a bus, train, ship, rotorcraft, or any other form of vehicle used to transport a plurality of individuals. Also, the light system 10 can be implemented in a fixed structure where controlled lighting for a seat occupant is desired.

Figure 2:
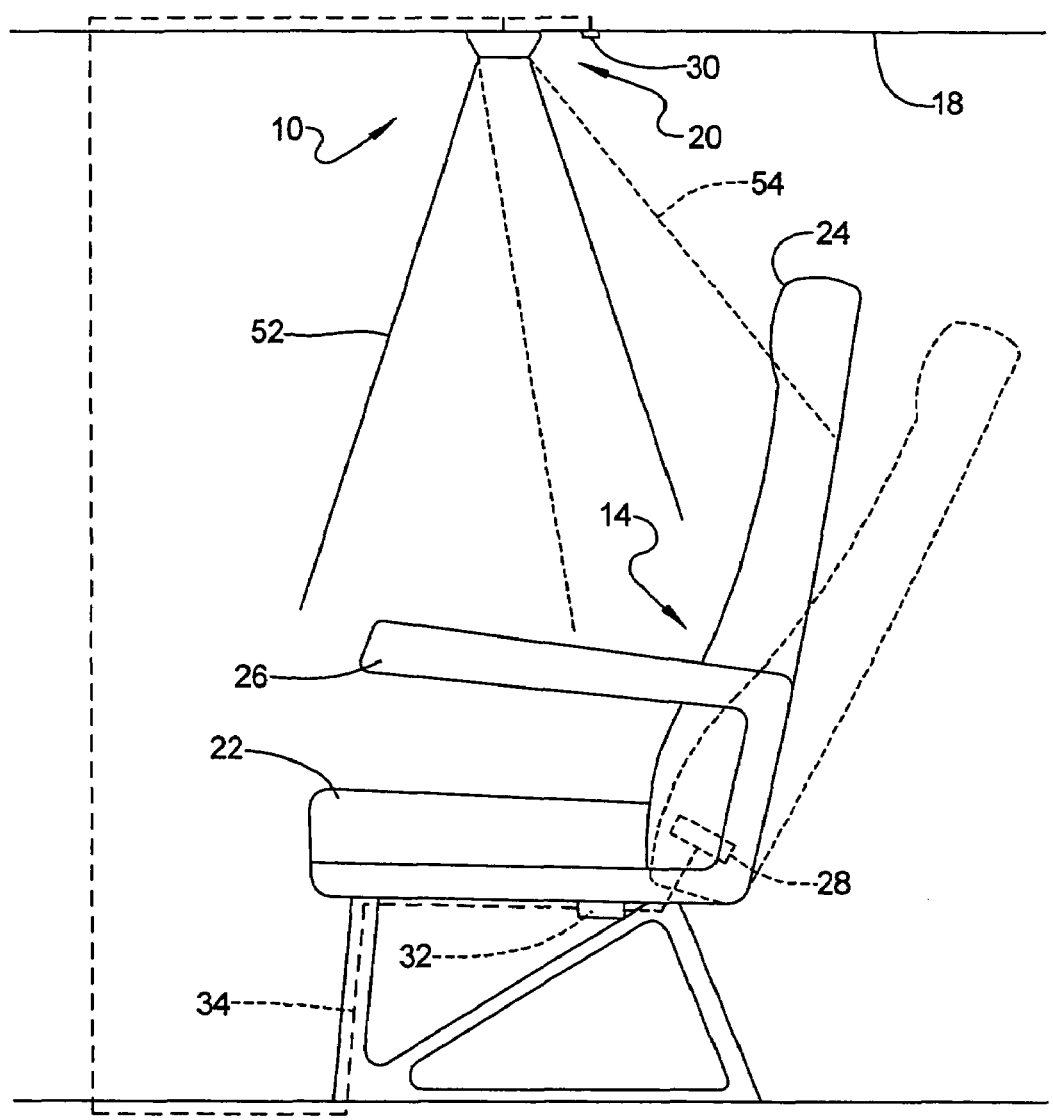
FIG. 2 is a simplified side view of one of the seats shown in FIG. 1 illustrating in greater detail an implementation of the present disclosure.

Referring to FIG. 2, the light system 10 includes a light assembly 20 supported from the overhead wall portion 18. The seat 14 includes a seat portion 22 and a seatback 24 that is movable pivotally relative to the seat portion 22. An armrest 26 is coupled to the seatback 24. The seat 14 is otherwise conventional and can be reclined by an occupant simply by pushing a button on the armrest 26 and urging the seatback 24 rearwardly.

The seat 14 includes a sensor 28, which may be mounted to a suitable frame portion of the seat 14 to sense when the seatback 24 is in its upright position, as well as its reclined position. The sensor 28 may comprise a microswitch, an optical sensor, a magnetic sensor, or any other form of sensing component that is able to sense whether the seatback 24 is in its upright, as well as its reclined, position. An on/off switch 30 supported from the overhead wall portion 18, and in communication with the light assembly 20, is used to turn on and off the light assembly 20. Alternatively, the on/off switch 30 could be employed on the armrest 26 of the seat 14.

Figure 2A:
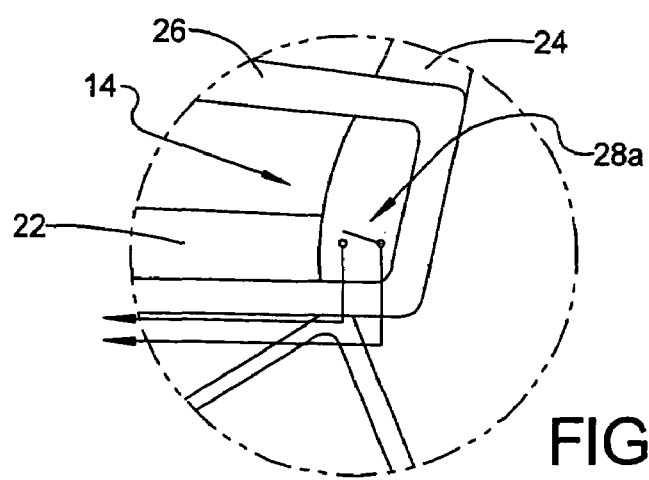
FIG. 2A is a side view of another implementation involving the use of an open/closed switch to sense the position of the seatback portion of the seat.

With brief reference to FIG. 2A, the function of the sensor 28 could instead be performed by a conventional open/closed switch 28a that is coupled to the seatback 24 or a frame portion of the seat 14 such that it is automatically opened or closed with the seatback 24 is moved from the upright position to the reclined position.

Referring again to FIG. 2, in one implementation, a controller 32 receives an output from the sensor 28 and provides an output to the light assembly 20. The signal to the light assembly 20 may be provided via one or more conductors 34, or also via a wireless RF signal. If a wireless RF signal is employed, then the light assembly 20 would also require a receiver for detecting the wireless signal.

Referring to FIG. 3, the light assembly 20 is illustrated. The light assembly 20 includes a housing 36 having a translucent portion 38. Within the housing 36 is a first light subsystem 40 and a second light subsystem 42. First light subsystem 40 is, in one embodiment, made up of a plurality of light-emitting diodes (LEDs) 44, while the second light subsystem 42 is similarly made up of a plurality of LEDs 46. The precise number of LEDs employed in each light subsystem 40 and 42 can be varied as needed, as well as the pattern arrangement of each of the LEDs 44 and 46, to provide a beam pattern having a desired shape. The first light subsystem 40 also includes a reflector 48 for helping to form the light beam generated by the first light subsystem 40. The second light subsystem 42 similarly includes a reflector 50 for assisting in forming the light beam generated by second light subsystem 42. Preferably, the LEDs 44 and 46 are also supported along an arc to help form their respective beams. Alternatively, conventional incandescent bulbs could be substituted for the LEDS 44 and 46. Still further, the first and second light subsystems 40 and 42 could be housed in separate housings, if desired. Each of reflectors 48 and 50 may comprise a simple, non-precision plastic lens having a curvature that assists in shaping the beam produced by its associated LEDs 44 or 46. The LEDs 44 and 46 may be conventional LEDs available from a wide variety of manufacturers, for example, Luminator USA of Plano, Tex. The LEDs 44 and 46 have a long service life and are low power consumption items.

Figure 4:
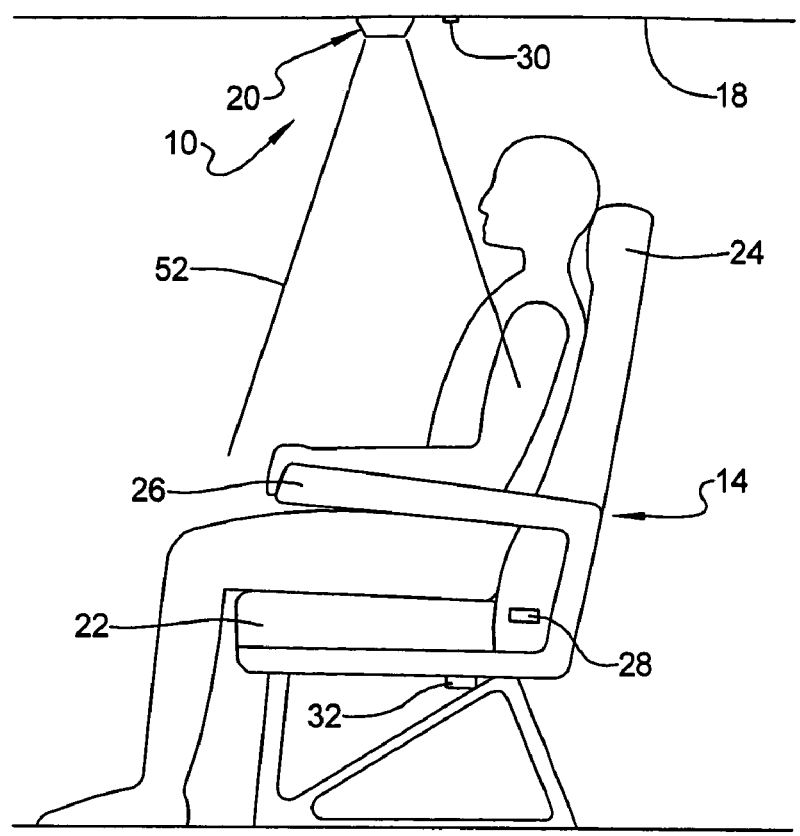
FIG. 4 is a simplified side view illustrating a first beam generated by the system to illuminate a lap area of an occupant seated in the seat.
Figure 5:
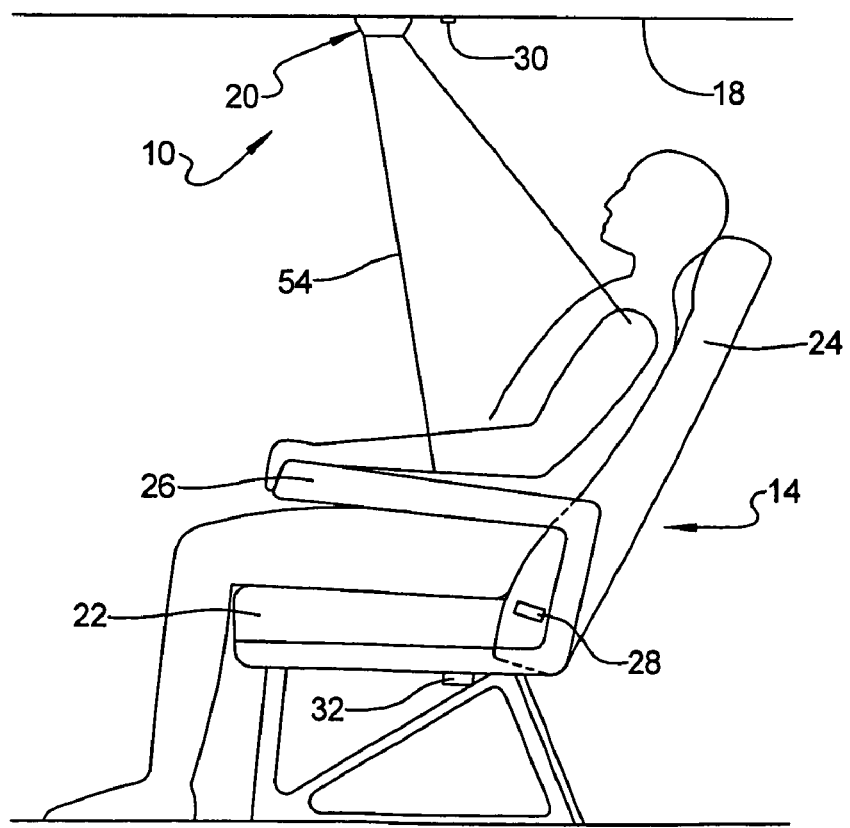
FIG. 5 is a simplified side view of the occupant in the reclined position in the seat, with the system producing a second light beam aimed for optimum use by the occupant while in the reclined position.

Referring now to FIGS. 4 and 5, the light assembly 20 can be seen generating a first light beam 52, which illuminates a lap area of an occupant of the seat 14, when the seatback 24 is in the upright position. This provides optimum use of the first light beam 52 for reading, writing or other tasks when the occupant is seated upright in the seat 14.

Referring to FIG. 5, when the seat occupant reclines the seatback 24 into the position shown, the sensor 28 signals the light assembly 20, via the controller 32, of this condition and the second light subsystem 42 (FIG. 3) is enabled to generate a second light beam 54. Light beam 54 is aimed to provide optimum use of the light it produces while the occupant is in the reclined position. In this example, first light beam 52 is turned off by the controller 32 (FIG. 2) to conserve power and prolong the longevity of the LEDs 44 and 46 or incandescent bulbs used with the first light subsystem 40. Alternatively, the first light subsystem 40 could be left turned on. When the seatback 24 is moved back to its upright position (FIG. 4), the controller 32 may turn off the second light subsystem 42 and again turn on the first light subsystem 40.

Light system 10 thus provides a completely "touchless" system for adjusting the light beams generated by the light assembly 20 to provide optimum light beam aiming for an occupant of the seat 14, regardless if the occupant is seated in an upright position or in a reclined position. A principal advantage of the light system 10 is that the complex construction of an orbital light element is not required, since no physical movement of the light assembly 20 is required. This eliminates complexity and cost in the construction of the light system 10, and also reduces the overall weight of the light system 10.

Furthermore, while a two-position seat has been illustrated in the drawings, it will be appreciated that the light system 10 could be modified to provide three or more beams that are each aimed in different directions with possibly different intensities or beam patterns, should an application arise where a three or more position seat is employed. Furthermore, the present disclosure could just as readily be implemented with a seat that is mounted on a track or rail that needs to be slid between two or more locations, but requires lighting for the seat occupant at each location. In this instance the sensor would sense the location of the seat, rather than the seatback position, and aim the light beams as needed. Still further, the present disclosure could be implemented in connection with a swivel mounted seat to automatically illuminate different areas depending upon the sensed rotational position of the seat.

The description of the present disclosure is merely exemplary in nature and, thus, variations that do not depart from the gist of the disclosure are intended to be within the scope of the present disclosure. Such variations are not to be regarded as a departure from the spirit and scope of the present disclosure.

What is claimed is:

1. A light system for use with a seat, the seat being reclinable from a first position to a second position by an occupant, the system comprising:

a light assembly having a first light subsystem and a second light subsystem;

each of the first and second light subsystems being non-movable and the first light subsystem being aimed to illuminate a first selected area when said seat is in said first position, and the second light subsystem being aimed at a second selected area different from said first selected area;

a sensor for sensing whether said seat is in said first position and in said second position;

said first light subsystem operating in response to said sensor to turn on when said sensor detects that said seat is in said first position to illuminate said first selected area; and said second light subsystem operating in response to said sensor to turn on when said sensor detects that said seat is in said second position to illuminate said second selected area.

2. The system of claim 1, wherein said sensor comprises a switch located on said seat adjacent a seatback portion of said seat.

3. The system of claim 1, further comprising a controller for interfacing with said switch and controlling said light assembly.

4. The system of claim 1, wherein at least one of said first and second light subsystems comprises a plurality of light-emitting diodes.

5. The system of claim 4, further comprising a focusing lenses disposed adjacent to said plurality of light-emitting diodes.

6. The system of claim 1, wherein said first light subsystem is turned off when said sensor indicates that said seat has been reclined into said second position.

7. The system of claim 1, wherein each of said light subsystems comprises a plurality of light-emitting diodes.

8. The system of claim 7, wherein each of light subsystems comprises a focusing lens.

9. A lighting system adapted for use with a seat, wherein the seat is reclinable from an upright position to a reclined position, the lighting system comprising:

a first light-emitting diode (LED) system supported generally above said seat and aimed to illuminate a first portion of said seat when said seat is in said upright position;

a second LED system supported generally above said seat and aimed to illuminate a second portion of said seat when said seat is positioned in said reclined position;

a sensor for detecting when said seat is in said upright position and in said reclined position; and a controller interfaced to said LED systems and to said sensor for turning on said first LED when said sensor detects that said seat is in said upright position, and turning on said second LED when said sensor detects that said seat is moved into said reclined position.

10. The system of claim 9, wherein at least one of said LED systems includes a focusing lens.

11. The system of claim 9, wherein said sensor comprises a microswitch located on said seat for detecting a position of a seatback portion of said seat.

12. The system of claim 9, wherein said sensor comprises an open/closed switch.

13. The system of claim 9, wherein said controller turns off said first LED system when said second LED system is turned on.

14. The system of claim 13, wherein said controller turns off said LED system when detecting that said seat has been moved from said reclined position to said upright position.

15. The system of claim 11, further comprising an on/off switch located on said seat for enabling an occupant of said seat to turn on and off said first LED systems.

16. The system of claim 9, wherein said first and second LED systems are disposed within a common housing.

17. The system of claim 9, wherein each of said first and second LED systems is arranged with its LEDs positioned to form an arc.

18. A method for controlling lighting for a seat on a mobile platform, comprising:

providing a first light system to illuminate a first portion of said seat when said seat is in an upright position;

providing a second light system to illuminate a second portion of said seat when said seat is in a reclined position; and sensing when said seat is moved into said reclined position and automatically turning on said second light system when said seat is moved into said reclined position.

19. The method of claim 18, further comprising sensing when said seat is moved from said reclined position to said upright position and turning off said second light system.

20. The method of claim 19, further comprising turning on and off said first light system with a user-actuated on/off control.

* * * * *